United States Patent [19]

Dahms

[11] 4,315,137
[45] Feb. 9, 1982

[54] THERMOSTAT RANGE CONTROLLER

[76] Inventor: Harald Dahms, 22 Lakeview Rd., Ossining, N.Y. 10562

[21] Appl. No.: 156,043

[22] Filed: Jun. 2, 1980

[51] Int. Cl.³ .......................................... G05D 23/30
[52] U.S. Cl. ................................. 219/391; 337/377; 219/366; 219/532; 219/540; 236/46 R; 236/68 B
[58] Field of Search ........... 337/377; 236/68 B, 46 R; 219/200, 201, 359, 365, 366, 381, 391, 530, 540, 532, 272

[56] References Cited

U.S. PATENT DOCUMENTS

| | | | |
|---|---|---|---|
| 2,409,954 | 10/1946 | Pearson | 219/201 |
| 2,513,919 | 7/1950 | Costello | 219/272 |
| 3,834,618 | 9/1974 | Buckwalter | 337/377 |
| 3,849,753 | 11/1974 | Nichols | 337/377 |
| 3,934,217 | 1/1976 | Brcic | 236/68 B |
| 4,014,500 | 3/1977 | Galtz | 337/377 |
| 4,032,069 | 6/1977 | Cannella | 337/377 |
| 4,099,152 | 7/1978 | Nichols | 337/377 |
| 4,188,604 | 2/1980 | Maybee | 337/377 |
| 4,205,782 | 6/1980 | Cannella | 236/68 B |

FOREIGN PATENT DOCUMENTS

| | | | |
|---|---|---|---|
| 8557674 | 5/1929 | Fed. Rep. of Germany | 219/532 |
| 2757143 | 7/1978 | Fed. Rep. of Germany | 236/68 B |

*Primary Examiner*—Gene Z. Rubinson
*Assistant Examiner*—Bernard Roskoski

[57] ABSTRACT

A thermostat range control device for maintaining a thermostat temperature that has a substantially constant difference with respect to room temperature, and which allows the thermostat to respond quickly and accurately to changes in room temperature. The device includes a detachable enclosure for substantially enclosing the thermostat, a distributed heater within the enclosure having multiple openings therein for providing generally uniform heat within the enclosure, means for allowing room temperature air to enter the enclosure at a level below the thermostat, and means for allowing heated air within the enclosure to exit from the enclosure at a level above the thermostat, in a manner such that substantially only heated air passes the thermostat.

22 Claims, 4 Drawing Figures

THERMOSTAT RANGE CONTROLLER

DESCRIPTION

1. Technical Field

This invention relates to a thermostat controller for extending the range of a thermostat, and more particularly to such a device which tracks room temperature changes rapidly and accurately and which delivers the same degree of temperature set-back to most thermostats, regardless of size and type.

2. Background Art

Temperature set-back devices are well known in the art and typically employ a small heater which provides heat to a thermostat in order to "fool" the thermostat into thinking that the temperature in the room is hotter than it really is. In this manner, the thermostat will not trigger the onset of the heat system and will thereby cause a saving in heating costs. Due to the recent energy crisis and the resulting increase in the cost of energy, devices which reduce the need for heating energy will be in increasing demand.

The more common thermostat set-back devices, such as those represented by U.S. Pat. Nos. 3,834,618; 4,032,069; 4,119,936; and 4,171,769 all use a small resistor positioned near a thermostat, the flow of current through the resistor causing it to emit heat in the general vicinity of the thermostat. With such a device, the thermostat senses the higher local temperature caused by the resistor, rather than the general room temperature actually present in the room, or rooms being controlled by the thermostat. For this reason, the heating system delivers less heat to the room with the result being fuel savings. When no current flows through the resistor, the local temperature is supposed to be the same as the general room temperature so that the thermostat can operate in a conventional fashion.

This type of set-back device typically provides an inaccurate temperature difference between the local temperature in the vicinity of the thermostat and the actual room temperature. These devices do not maintain an accurate difference in temperature between the local temperature and the room temperature and also do not rapidly track changes in the room temperature. Further, these types of devices do not operate the same with all types of thermostats and are particularly subject to the effect of thermal currents in the room when the furnace turns on. They often provide swings in temperature that are too large, especially when the furnace is turned on.

I have actually found that these devices become completely erratic when they are subject to room drafts, i.e., when drafts change the direction of the heat column rising out of the point source resistance heater in the set-back device. Sometimes the heat column hits the thermostat while at other times it misses the thermostat, depending on air currents in the room.

In another class of thermostat set-back devices, exemplified by U.S. Pat. Nos. 1,876,636; 1,931,464; and 3,386,496, the set-back heat resistor or lamp is located in the same housing as the thermostat bimetallic control element. Often, ventilation holes are made in the top and the bottom of the housing to allow air to enter and leave the thermostat housing. However, in some circumstances the resistors are used to bias the thermostat, and in any event are part of the electronic circuitry related to and associated with the thermostat control element. Rather than being able to readily modify a thermostat to provide an accurate set-back, a person would have to buy an integrated unit having the heat resistor and the thermostat within a single, large housing. Since this is an expensive device which also requires more extensive wiring, that type of solution is less attractive to a person who wants to be able to make his own heat system more energy efficient without having to completely replace his thermostat units. In a similar vein, it is impractical for many people to replace their existing thermostats with thermostats which give lower temperature settings, such as 40° F. Still another problem with integrated thermostat-heat resistors is that these thermostats do not respond as quickly to the changes in room temperature as would be desired.

In many homes, a single thermostat or group of thermostats is provided which have a lower temperature limit of approximately 50°-55° F. Many people do not want the expense of buying a new thermostat and/or the difficulty of having to wire new thermostats into already existing electrical lines. Still further, many people are interested in an accurate set-back device which would accurately keep their homes at a low temperature of about 40° F., during extended periods of absence, such as vacations and holidays. A temperature of about 40° F. saves the maximum amount of energy without subjecting the home to the danger of freezing pipes. That is, the amount of temperature set-back should be accurately controllable and the set-back device should not affect the operation of the thermostat if the set-back device fails in any way.

The prior art has not provided a truly accurate and rapidly responding set-back device and especially an accurate set-back to 40° F., which can be used with thermostats having a low setting of 50° or 55° F. It will be appreciated that for this particular application (i.e., a set-back to 40° F.) the set-back device has to operate accurately and fast to avoid any danger of freezing and damage to water pipes that would occur if the home temperature would be allowed to fall below 32° F. This is perhaps the reason why many of the commercially available set-back devices are timer operated and are intended to be used only at night when less heat is required. That is, presently commercially available set-back devices are so inaccurate that they are sold only in combination with timers which shut them off after a few hours of operation. In this way they avoid the danger of freezing which would be caused by their inaccuracy. Thus, the prior art has not developed a device which can be used safely over extended periods of time, as for instance when people are away on vacation. Still further, the prior art has not developed a set-back device which is inexpensive and which will provide an accurate and rapidly responding set-back for many different types of thermostats.

Prior art attempts at providing set-back devices have failed to provide accurate and fast tracking of temperature changes for several reasons. One of these is that it has not been recognized that proper guidance is required for delivery of heated air to and past the thermostat. Another reason relates to the type of heater. In the prior art devices, point source heaters, such as resistors and lamps, were used. These are not as accurate in providing a precise set-back. Still another reason is that it was not recognized that a well defined geometry is needed between the heater, the means to guide heated air pass the thermostat, and the thermostat itself. In the present invention, an accurate and fast tracking thermostat range controller is provided using these considerations. As will be apparent the performance of this novel device is vastly superior to those of the prior art.

Therefore, it is a primary object of the present invention to provide a low cost thermostat range controller which provides a substantially constant set-back and which tracks very accurately any changes in room temperature.

It is another object of the present invention to provide an improved set-back type device which will not alter the safe operation of a thermostat, even when the set-back device is inoperative due to failure therein.

It is a still further object of this invention to provide an improved thermostat range controller which can be easily adapted for use with many different types of thermostats and which can be installed and removed with relative ease, and without affecting the thermostat.

It is a further object of the present invention to provide a thermostat range controller which is substantially insensitive to room drafts, air currents, opening and closing of doors and windows, and all other factors which would tend to alter the degree of set-back.

It is another object of the present invention to provide an improved set-back type device whose operation is quite insensitive to the line voltage fluctuations in the house or building in which it is used.

It is another object of the present invention to provide an improved thermostat range controller which responds rapidly to changes in room temperature, while at all times maintaining the same temperature difference between ambient and thermostat.

It is a still further object of the present invention to provide an improved thermostat set-back type device which yields essentially the same temperature difference regardless of the type and make of the thermostat with which it is used.

It is another object of the present invention to provide an accurate set-back type device which can be operated safely for long periods of time, or even overnight or other short time periods.

DISCLOSURE OF INVENTION

This thermostat range controller has a distributed heat source (such a planar heater element) located externally to the housing in which the thermostat control element is located. This heater element is not located in the thermostat housing, and is not a part of the electrical circuitry within the thermostat housing.

This range controller is broadly comprised of a distributed heat source which provides heat over an extensive cross-section and an enclosure means which provides a guidance means for directing heated air past the entire area of the thermostat. Thus, the guidance means and the heater located within it are specifically designed to provide a very uniform distribution of heat across an area which is larger than the area of the thermostat itself. As will be more fully apparent, a much more accurate device results and many of the problems associated with prior art point source type of heaters is avoided.

The distributed heat source provides heat over the majority of the enclosure cross-section, preferably by the following means:

1. An electrical heating element(s) which traverses the enclosure cross-section several times, and which divides the enclosure cross-section into a plurality of small sections to each of which heat is applied.

2. An electrical heater which transfers its heat to a metallic conductor having multiple openings such as a wire screen. Such heat transfer may occur by direct contact between the heater and the metallic conductor or by heated air contacting the metallic conductor.

The enclosure means fits over the thermostat housing and easily attaches to the wall on which the thermostat is located. The enclosure is designed in a manner to guide heated air from the heater element to the thermostat and then to an exit located above the thermostat. It is typically closed on its sides and in the front, but has openings below the thermostat and above the thermostat to allow air from the room to enter and leave the enclosure. An opening is made in the back surface of the enclosure means in order to allow the thermostat to project into the volume within the enclosure means when the enclosure means is mounted against the wall on which the thermostat is located. The enclosure "hugs" the wall so that there is no substantial amount of room air which can strike the thermostat directly. Thus, a very controlled environment is provided for the thermostat, which primarily sees only the air which enters the enclosure means and is heated therein.

The distributed heater located within the enclosure means is below the thermostat. It is designed to provide a uniform flow of heat throughout the cross-sectional area of the enclosure and particularly in the vicinity of the thermostat. It is further designed to allow air from the room to enter the enclosure means from the bottom, there being openings in the top surface of the enclosure to allow air to leave the enclosure. When the heater is activated, the local environment within the enclosure means becomes warmer than the temperature of the room, by an amount determined by the heater, the dimensions of the enclosure, and the openings for entry and exit of room air. The dimensions of the enclosure means are such that the thermostat does not block more than about 75% of the cross-sectional area of the enclosure means. Also, it is preferable to have a gap of at least about ½ inch between the sides and front of the enclosure means and the thermostat, as well as between the planar heater and the bottom of the thermostat.

The enclosure means is capable of being mounted on the wall in which the thermostat is located, and is readily detachable from the wall. Because it has only a small weight, only a minimum amount of retention is required to have it rest flush against the wall. The size of the enclosure means is such that the area being heated is larger than the area of the thermostat, in contrast with prior art set-back devices in which only a small portion of the thermostat is heated by the set-back heater. The walls of the enclosure means are typically straight walls and the height of the enclosure means is not so large that mixing of heated air from the heater element will take an adversely long amount of time.

A planar distributed heater is conveniently provided by a mesh grid or another type of heating element which extends substantially throughout the cross-sectional area of the enclosure means. In this regard, since the walls of the enclosure are colder than the interior of the enclosure due to thermal currents, a heater design is chosen to provide more heat along the exterior walls of the enclosure than in the center of the enclosure. Due to a chimney effect of air entering the bottom of the enclosure and exiting from the top, a uniform heat distribution will be provided over the thermostat and the effects of the cooler interior walls of the enclosure will be avoided.

These and other features, objects, and advantages will be more apparent from the following more particular description of the preferred embodiments.

BEST MODE FOR CARRYING OUT THE INVENTION

Figure 1:
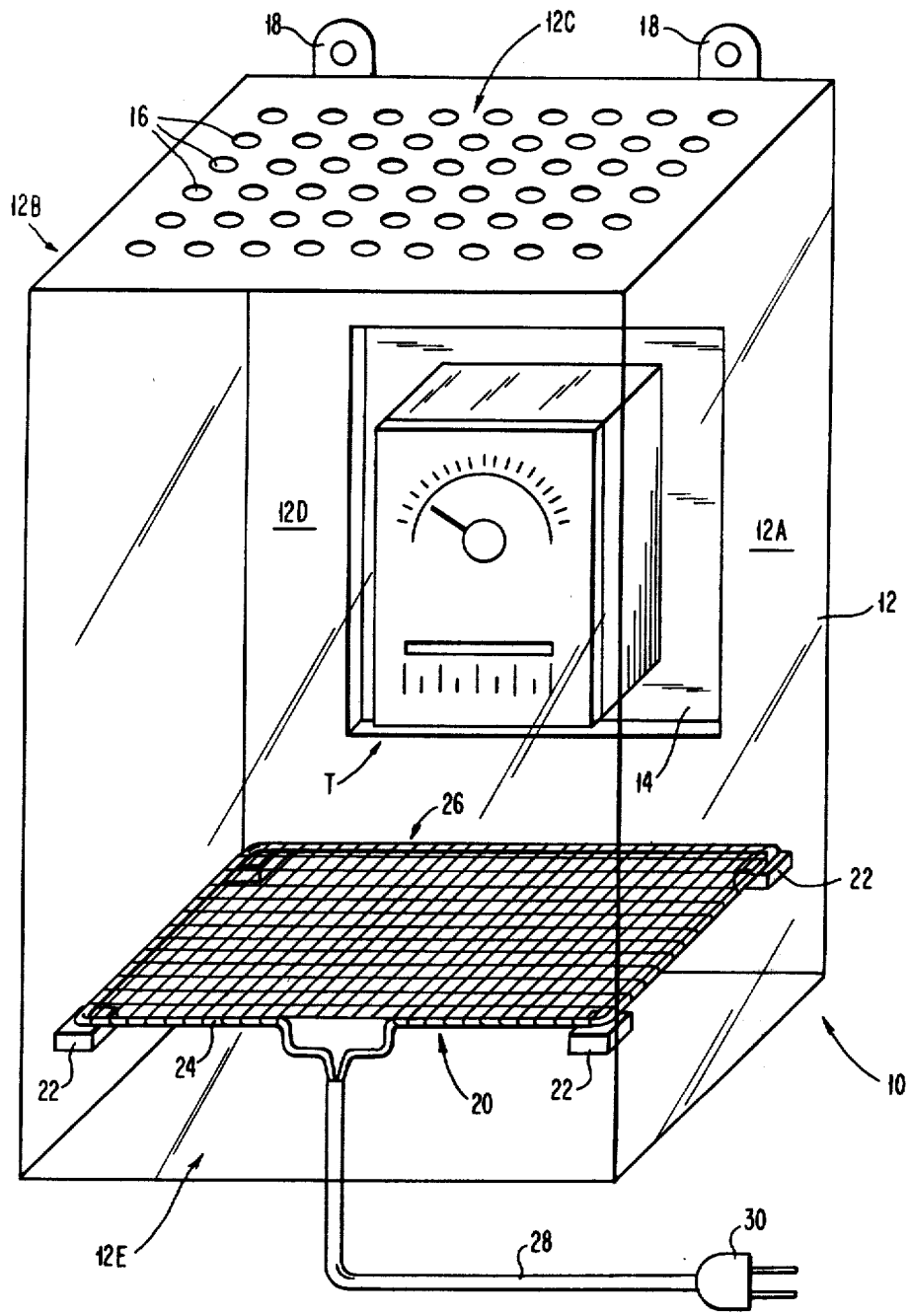
FIG. 1 is a schematic illustration of the device illustrating how a substantially controlled environment is provided for the wall mounted thermostat.

FIG. 1 is a schematic illustration of a thermostat range controller in accordance with the present invention, wherein a well controlled environment is provided around a wall mounted thermostat T. Controller 10 is comprised of an enclosure (air guidance means) 12 including sides 12A, 12B, an apertured top 12C, and a back 12D. The bottom of enclosure 12 is generally open, the opening being designated 12E. Back surface 12D has an opening 14 therein which fits around the thermostat T so that device 10 can be positioned flush against the wall on which the thermostat T is located. Opening 14 also limits the size of the thermostat which can be used with device 10. Of course, the entire back of enclosure 12 can be open, as long as the enclosure is flush against the wall on which the thermostat is mounted, and the thermostat size is such that there is room within the enclosure for sufficient air flow past the thermostat. Brackets 18 are provided for mounting device 10 on the wall around thermostat T. These brackets can be located in the interior of enclosure means 12 or elsewhere, depending upon the aesthetic effect to be achieved.

A heater means 20 is located within enclosure means 12 and is generally supported within the enclosure means by the supports 22, located around the inside walls of enclosure 12. As is apparent from FIG. 1, heater 20 is not flush with the bottom of the enclosure means, but is positioned within the interior of the enclosure means so that it is below thermostat T and above the bottom of the enclosure means 12. Room air will enter enclosure 12 from the bottom and pass through heater means 20, thereby being warmed. The warmed air will leave through apertures 16 in top surface 12C.

As will be more apparent later, heater 20 should be a distributed heat source which provides a heat distribution in the vicinity of the thermostat T, and should take into account the fact that the volume within enclosure means 12 closest to the walls of the enclosure means is apt to be more cool than the interior portions of the volume within the enclosure means. In FIG. 1, heater 20 is comprised of a resistance wire 24 which is located around a conductive wire mesh 26, heater wire 24 being connected via electrical line 28 to a plug 30. Plug 30 can be directly connected to the 110 volt outlets found in homes and offices. Further details of the heater 20 will be presented with respect to the embodiments shown in FIGS. 3 and 4.

In a preferred embodiment, the entire enclosure 12 is transparent. However, only a portion of the front surface 12E need be transparent so that the thermostat T is easily viewable.

The provision of enclosure means 12 is an important part of this invention, and it is this enclosure and the distributed interior heater 20 that provides an accurate thermostat range controller. These components provide a means for producing and guiding uniformly heated air past thermostat T to provide an accurate set-back temperature that rapidly tracks fluctuations in the room temperature. The bottom of enclosure means 12 is typically open to allow room air to enter enclosure means 12. This air passes through the heater 20 and is heated very uniformly, so that the distribution of heat across the entire cross-sectional area of thermostat T is very uniform. The area of higher temperature is larger than the area of the thermostat, in contrast with prior art devices wherein only a small portion of the thermostat is subjected to the heated air. Further, substantially all of the air which reaches thermostat T will be heated air—not unheated room air. These features are important in the provision of a substantially constant temperature difference between the room temperature and the temperature in the immediate vicinity of thermostat T.

Enclosure means 12 is detachable and provides an essentially complete surrounding for thermostat T, when attached to the wall. Its top 12C is provided with a plurality of apertures 16, the number and size of such apertures being determined with respect to the volume of air that must pass through enclosure means 12. The difference in temperature between that within enclosure 12 and room temperature is determined by the heater 20 and the number of openings 16 in surface 12C. In a typical case, a set-back of 10°–15° F. is desired and the exact design of device 10 is set with that range in mind.

The dimensions of enclosure 12 are chosen in order to provide the same heat environment in the vicinity of thermostat T regardless of the make and type of the thermostat. For this reason, the size of enclosure means 12 is sufficiently large that a substantial air flow can occur around it, when enclosure 12 is mounted flush with the wall on which thermostat T is located. Opening 14 determines the size of the thermostat that can be accommodated by enclosure means 12, it being preferred that there be a gap between the enclosure wall and the thermostat. As long as a wall thermostat will fit within opening 14, this range controller will provide sufficient air flow for the temperature set-back for which it has been designed. This is another feature which distinguishes it from prior art set-back devices, wherein the temperature set-back varied depending upon the thermostat with which it was used.

Enclosure means 12 is designed so that room temperature air enters at a level below the thermostat and exits as heated air at a level above the thermostat, when the controller is in operation. Heater 20 should provide uniformly heated air over an area larger than the thermostat and essentially over most of the interior cross-section of enclosure 12. The cross-sectional area of enclosure 12 should be larger than the thermostat and should have sufficient height that a good flow of heated air is provided over the area of the thermostat. Examples having particular dimensions will be given below.

Figure 2:
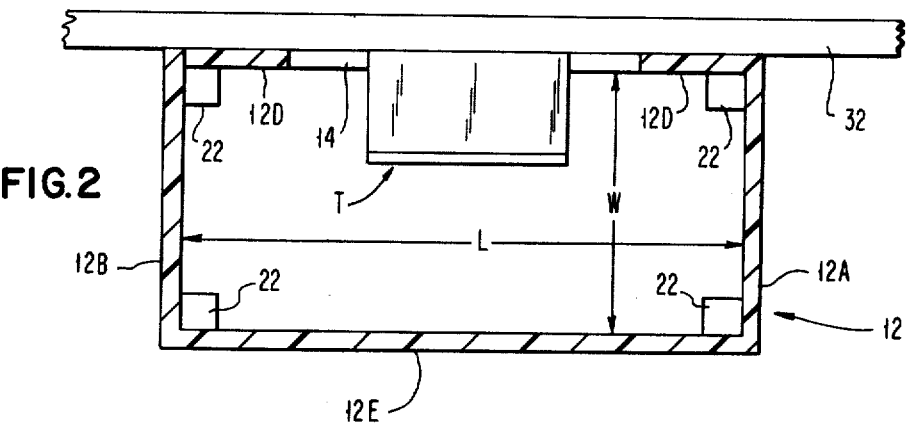
FIG. 2 is a top view of the device, showing a cross-section of the enclosure and the wall mounted thermostat, and is used to illustrate the size of the enclosure relative to the thermostat.

FIG. 2 illustrates a cross-sectional view of the controller device 10 of FIG. 1. The thermostat T is mounted against wall 32, and enclosure means 12 is also mounted flush against wall 32. Opening 14 surrounds thermostat T, and the interior of enclosure means 12 has a width L and depth W. As is apparent from this figure, depth W is greater than the projection of thermostat T from wall 32, in order that there be a substantial flow of heated air across the entire base and area of thermostat T. In general, the thermostat cannot block more than about 75% of the cross-section of enclosure 12.

In one embodiment, the width L has approximately 6 inches while the depth W was approximately 3¼ inches. Opening 14 was centered in the width of back surface 12D in order to leave 1 inch of enclosure means on each side of thermostat T. The bottom of opening 14 was 2½ inches from the bottom of enclosure means 12, and ½ inch from the top surface 12C of enclosure 12. The heater had an electric resistance of 1650 ohms, so that at a line voltage of 115V it was delivering 8 watts (according to $V^2/R = W$).

This embodiment delivered a temperature rise of 8.0° C. = 14.4° F.

Figure 3:
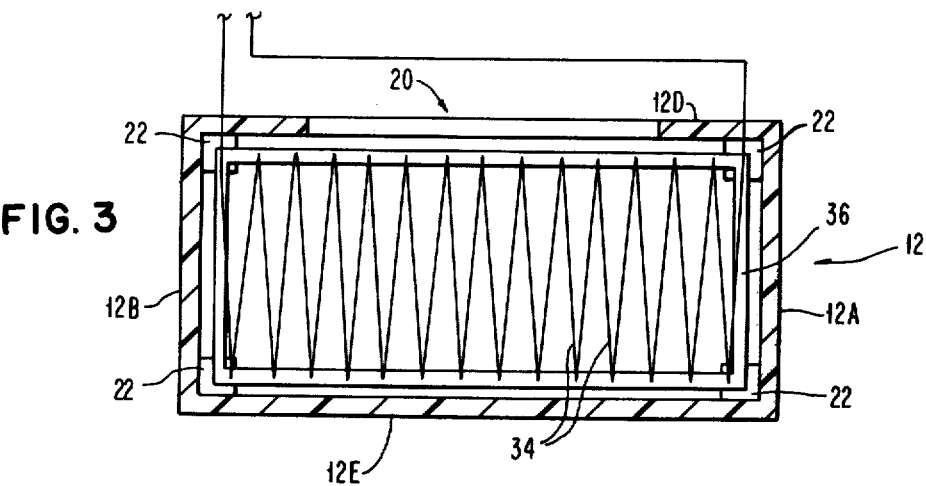
FIGS. 3 and 4 illustrate two possible configurations for a distributed heat source element located within the enclosure.
Figure 4:
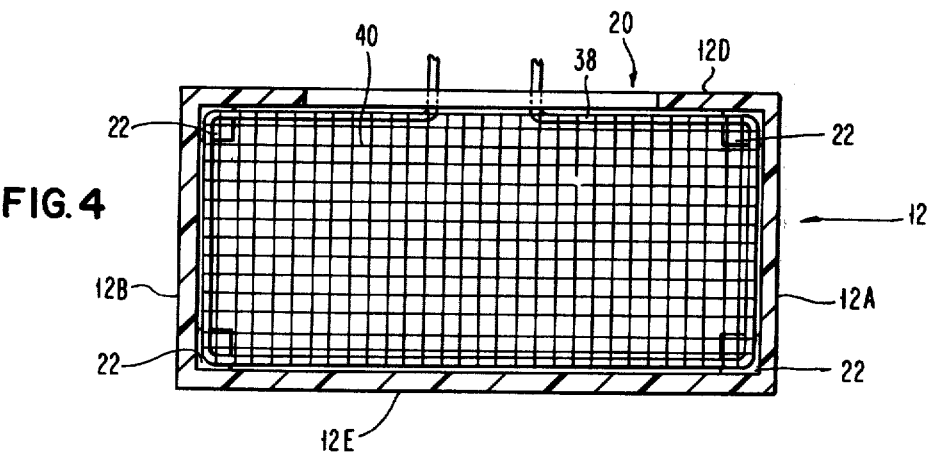

FIGS. 3 and 4 show two embodiments for a heater 20. In FIG. 3, a heating wire 34 is supported by a frame 36, which in turn rests on the supports 22. Wire 34 zig-zags across the frame 36 in order to provide an area of substantially uniform heat. The leads from the heater wire can be directly attached to the line cord for insertion into a standard 110 volt outlet.

In FIG. 4, heater 20 is comprised of an insulated heater wire 38 which extends around the interior periphery of enclosure 12. Wire 38 directly contacts, but is electrically insulated from a heat conducting wire mesh 40. Wire mesh 40 is similar to a conventional window screen, having small openings therein through which air can pass. It can be made of copper or alloys such as brass, bronze, etc. Thermal conduction passes heat from wire 38 to wire mesh 40, thereby making the wire mesh an integral portion of the planar heater. Since heater wire 38 is located close to the interior walls of enclosure 12, it will provide more heat along the walls and will compensate for the fact that the area closest to the walls tends to be the coolest.

When wire mesh 40 becomes heated it will transfer its heat to the incoming air across its area. The net result is that the heated air which flows past theremostat T will have a substantially uniform heat. This means that the temperature difference between the environment around the thermostat and the room temperature environment will be maintained substantially constant. Further, since there is substantial air flow through enclosure means 12, the device will rapidly (within a few minutes) track changes in room temperature.

Adverse effects due to thermal drafts, opening and closing of doors and windows, etc. will be largely prevented by the fact that enclosure 12 substantially surrounds the thermostat T. Actually, as the rooms to be controlled by device 10 become larger or more subject to difficult conditions (such as air currents and drafts of any type) the operation of the present device becomes even more improved with respect to that of prior art devices. In this regard, it should be noted that point source heaters, such as prior art resistors and heat lamps, by themselves, will not work to provide heated air substantially over the entire cross-section of enclosure 12. It has been found to be preferable to use planar-type heaters with multiple openings therein. By "planar", it is meant that the heater extends laterally over a large area (i.e., one covering at least about 75% of the cross-sectional area of enclosure 12). Multiple openings provide sufficient room for air to pass through the heater over a larger area, so that many columns of heated air are provided, giving a substantially uniformly heated environment within enclosure 12.

In operation of this device, if heater 20 becomes disabled in any way (such as an open circuit), it has been found that the operation of thermostat T will not be adversely affected, and it will operate as though the heater were not present. That is, it will sense changes in temperature in the room and will respond in a fashion which is substantially identical to the way it would respond if device 10 were not in place. For this reason, a user can leave the enclosure means 12 in its position on the wall and just unplug the power cord 28, when it is desired not to use the range controller device. It is not necessary to remove the enclosure means from the wall, although this can be easily done. In many respects, it may be advantageous to leave device 10 on the wall, as it will tend to prevent undue influence by effects such as drafts, etc., on the thermostat. Therefore, the heat system will not be triggered into providing heat for every sporatic development in the rooms being controlled.

The heaters of FIGS. 3 and 4 are representative examples of distributed heat sources, i.e., the heat produced by them is distributed over a larger area. These heaters must have multiple openings through which air can pass and be heated before moving to the thermostat. As a general guideline, it has been found that the air columns going through the heater openings should be less than 1 inch thick, and preferably much less than that. The openings in wire mesh 40 provide sufficiently small heated air columns that uniformly heated air is provided to a thermostat located about ½ inch or more above it. The heater is generally disposed in a plane perpendicular to the height of enclosure 12, in order to produce heated air over substantially all of the cross-sectional area of the enclosure 12. As long as multiple openings are provided, most of the air which enters enclosure 12 will be heated and will flow past thermostat T.

As an example of the heating element shown in FIG. 4, a resistance wire 38 was used having a resistance of 1500 ohms and a length of 17 inches around the inside periphery of enclosure 12. Wire mesh 40 was comprised of a copper wire mesh having 16 wires per inch of 0.018 inch diameter. For an enclosure means having a width of 6 inches and a depth of 3¼inches, this heater 20 substantially covered the interior cross-section of an enclosure 12.

EXAMPLE DEVICE

Although representative dimensions have been mentioned for device 10 in accordance with this invention, the following will describe at least one such device which provided a constant, fast responding temperature difference of 8° C.(14.4° F.), when operated at a line voltage of 110 volts. Enclosure 12 had a height of 8 inches, and was comprised of ⅛ inch thick plexiglass having a width of 6 inches and a depth of 3¼ inches (overall exterior dimensions). The lower edge of the thermostat T was approximately 2½ inches above heater 20, and the heater 20 was 1 inch above the bottom of enclosure 12. Heater 20 was of the type described with respect to FIG. 4, wherein heater wire 38 had a resistance of 1500 ohms and a length of 17 inches. A copper wire mesh 40 was used having 16 wires per inch, each of which was 0.018 inch in diameter. The top surface 12C of the enclosure 12 had 153 holes therein, evenly distributed over the top surface. Each of the holes had a diameter of 0.161 inch. The dimensions of opening 14 in back surface 12D of the enclosure were such that the opening was ½ inch below the top surface of the enclosure means, and the sides of the opening were 1 inch from side surfaces 12A and 12B. The bottom of opening 14 was 2½ inches above the heater 20.

ALTERNATIVES

From the foregoing description, it will be readily apparent that design changes can be made within the scope of the present invention. Voltage sources may be either direct line voltage (the cheapest design) or any converted A.C. or D.C. voltage provided by a transformer, rectifier, battery, etc. If a resistance type heating element is used, the energy (voltage)$^2$/resistance = watts. With a resistance type heater, the most constant temperature difference is provided by a regulated voltage source, which is independent of line voltage fluctuations. Since the power delivered to the heater varies as (voltage)$^2$, it would be expected that a 10% voltage change would cause a 21% temperature change. However, it has been found that a voltage change of ±10% of line voltage (115±11.5 volts) results in a temperature change of only ±1.2° C. (2.1° F.) which is an acceptable range. Thus, the present design provides such a constant thermostat environment that even a variation in line voltage does not cause unacceptable deviations.

It can also be envisioned that some openings may be provided in side walls 12A and 12B and in front wall 12D in order to vent heated air within enclosure 12. These added openings should be limited in number and sizes so that the main flow of heated air past the thermostat is from the heater to the openings in top 12C. Also, designs can be provided with different numbers of openings 16 in top surface 12C, in order to provide different temperature set-backs. Thermostat range controller 10 can be made adjustable if a slidable plate is provided along the top surface 12C in order to open or block parts of apertures 16. This is a straightforward design consideration, where the slidable plate would have markings thereon indicating the temperature set-back which would be provided depending upon placement of the slidable plate along the top surface 12C. Of course, other techniques for adjusting the air flow through enclosure 12 can be used.

Still further, while the entire bottom of enclosure 12 has been removed in the design shown, it may be desirable to provide a more restricted opening. This can easily be done using an apertured plate such as that shown for surface 12C. The large opening in the bottom of enclosure 12 means that the heater 20 can easily be removed for repair or replacement, if it is desired to change the set-back temperature by changing the heater 20.

While replacement of heater 20 can be used to provide different temperature set-backs, it is also envisioned that a rheostat, or the like, can be used to adjust the amount of current or voltage to the heater in order to change its characteristics. However, it is generally desirable that the mass of the heater be kept very small in order to more quickly track room temperature changes. In this regard, the large uniformly heated surface provided by the design of heater 20 is very important as it allows more rapid and accurate response of the device to changes in room temperature, than do the small point source heater elements of the prior art.

In the practice of this invention, a low cost design has been shown which is suitable for use with many different types and sizes of thermostats. However, it is possible to provide different designs consistent with this invention for any types of thermostat. One of the most advantageous features of the present invention is that the design illustrated can be used with almost any type or size of thermostat (i.e., any type which fits through opening 14) and will provide essentially the same set-back temperature with all of these different types of thermostats. No complex electrical wiring is required and the enclosure means can be left on the wall without adverse effect even if the heater is unplugged from its power source. Because of its low cost and accuracy, and its fast response, this device can be immediately used to save energy in homes and buildings throughout the country.

While it does not require a timer, one can be used with it in a conventional manner. A programmed enclosure or an old thermostat which is programmable can be used for more sophisticated temperature programs. For example, a programmer (electromechanical or a microprocessor) may be used to switch the heater off, as for instance one hour before the start of the work day. This means that the building will be at a comfortable temperature at the beginning of the work day. In this situation, the thermostat is set at room temperature and the enclosure may develop as much as a 30° F. temperature difference as compared to the room temperature. For example, if the room temperature is to be held at 68° F., the programmed device would be able to drop the temperature to 38° F.

In order to provide for good circulation of air within the enclosure, it is also feasible to have the heater working at all times. To accomplish this in a situation where a room temperature of 68° F. is desired during the day, the thermostat is set at 78° F. and the heater is set to develop low power in order to provide a 10° F. difference in the enclosure. For a desired night temperature of 40° F., the thermostat is left at 78° F., but high power is now applied to the heater so that sufficient heat is developed to provide a 38° F. difference. Thus, the device of the present invention can be used with remote control systems or with associated switches to change the power to the heater between a low (day) and high (night) setting.

While the invention has been particularly shown and described with reference to preferred embodiments thereof, it will be understood by those of skill in the art that the foregoing and other changes in form and details may be made therein without departing from the spirit and scope of the invention.

Having thus described my invention, what I claim as new and desire to secure by Letters Patent is:

1. A thermostat range controller adapted for use with a wall mounted thermostat, comprising:
   an enclosure means separate from a thermostat and its housing, adapted to be mounted on a wall supporting said thermostat in a position such that said enclosure means surrounds said thermostat, said enclosure means including a back wall thereof having an opening therein through which said thermostat projects when said enclosure means is attached to said wall in a manner to be substantially flush with said wall,
   a distributed heater means having openings therein located within said enclosure means and directly vertically above the bottom of said enclosure means and at a level below the bottom of said opening, means for conveying heated air to the area of said thermostat including:
  intake means on said enclosure means located directly vertically below said distributed heater for receiving air from the room in which said thermostat is mounted, and
  exit means on said enclosure means and located directly vertically above said distributed heater means for allowing heated air within said enclosure means to exit from said enclosure means,
  wherein the volume of said enclosure means is greater than the volume of said thermostat and wherein the flow of air through said enclosure means is in a substantially vertical path from said intake means to said exit means.

2. The controller of claim 1, where said heater means includes means for providing heat substantially throughout the cross-section of said enclosure means.

3. The controller of claim 2, where said heater means is electrically energized and extends substantially throughout the cross-section of said enclosure means.

4. The controller of claim 3, where the bottom of said enclosure means is substantially open.

5. The controller of claim 1, where said enclosure means includes a front wall having a substantially transparent portion thereof to allow viewing of said thermostat.

6. The controller of claim 1, where the bottom of said enclosure means is substantially open and the top of said enclosure means includes a plurality of apertures therein for allowing exit of heated air from said enclosure means.

7. The controller of claim 6, where said enclosure means includes supports therein for supporting said heater means, said heater means extending substantially across an interior cross-section of said enclosure means.

8. The controller of claim 7, wherein said heater means is comprised of a resistance wire having a line cord connected thereto for insertion into a conventional wall outlet, said heater wire being located close to the periphery of the interior of said enclosure means.

9. The controller of claim 7, where said heater means includes an electrical heating element and a planar metallic conductor, there being openings in said conductor to allow room air to pass therethrough, and wherein said electrical heater transfers heat to said metallic conductor.

10. The controller of claim 7, where said heater means includes a resistance wire for carrying electrical current, said resistance wire being disposed in a plane and having a length sufficient to transverse the width and length of the cross-section of the interior of said enclosure means a plurality of times.

11. A thermostat range control device adapted for use with a wall mounted thermostat and separate from said wall mounted thermostat, said device including:
  an enclosure means separate from said thermostat both electrically and structurally and being adapted to be mounted on said wall so that it surrounds said thermostat and said thermostat projects into the interior of said enclosure means, said enclosure means including:
    an opening in a back wall thereof through which said thermostat projects when said enclosure means is mounted on said wall,
    intake means at the bottom of said enclosure means and including an opening in which room temperature air can enter said enclosure means, said intake means being located below said opening in said back wall,
    exit means directly vertically above said intake means, said exist means located on said enclosure means and at the top of said enclosure means above said opening, said exit means providing openings therein through which heated air in said enclosure means can exit from said enclosure means,
    a distributed heater means having openings therein located within said enclosure at a level between said opening and the bottom of said enclosure means,
    side walls for substantially guiding said heated air from said heater means to said thermostat,
    said heater means, intake means, said exit means providing a vertical, columnar structure for passing substantially only heated air past said thermostat said heated air traveling vertically in a direction substantially parallel to the wall on which said thermostat is mounted.

12. A thermostat range control device specifically for providing heated air to a thermostat, including:
  an enclosure means adapted to be detachably mounted onto a wall on which a thermostat is located, said enclosure means having a top wall vertical side walls to prevent side drafts onto said thermostat, a vertical back wall which is substantially flush with the wall on which the thermostat is mounted when said enclosure means is mounted on said wall, said back wall having an opening therein through which said thermostat projects into said enclosure means when said enclosure means is mounted on said wall,
  a bottom portion of said enclosure means being open to allow the flow of room air into said enclosure means,
  said top wall having at least one aperture therein for allowing the exit of heated air from said enclosure, wherein said opening for the intake of air into said enclosure means is located vertically below said thermostat and said top wall of said enclosure means is located vertically above the top of said thermostat, and wherein said enclosure means channels the flow of heated air therein in a vertical direction parallel to the wall on which said thermostat is mounted, said enclosure means having a height greater than the height of said thermostat, a width greater than the width of said thermostat, and a depth greater than the depth of said thermostat,
  heater means located within said enclosure means and at a level below the bottom of said thermostat, said heater means having openings therein and extending substantially throughout a cross-sectional area of said enclosure means and adapted to provide heat across said cross-sectional area.

13. A temperature range controller for use with a wall mounted thermostat allowing one to extend the useful range of said thermostat and comprising, in combination:
  a wall mounted thermostat,
  a heat guidance means for guiding heated air past said thermostat and for substantially excluding direct access of unheated room air to said thermostat, said guidance means including a vertical columnar enclosure means for substantially enclosing said thermostat and having an intake opening therein below said thermostat for allowing room air to enter said enclosure means and an exit opening above said thermostat for allowing air to leave said enclosure means, a distributed heat source located within said enclosure means at a level below said thermostat, said intake opening, said distributed heat source, and said exit opening being located along a vertical path parallel to the wall on which said thermostat is mounted, said heat source including means for heating multiple columns of air across a cross-sectional area of said enclosure means, said heated air columns passing said thermostat and exiting from said exit opening in the top of said enclosure means, there being multiple openings in said heat source to allow room air to pass therethrough to be heated for provision of said multiple columns of heated air.

14. The controller of claim 13, where said enclosure means includes front and side walls which are substantially straight and vertical, there being openings at the bottom and top of said enclosure means for entry of room air into said enclosure means and for exit of air from said enclosure means, respectively.

15. The controller of claim 13, where said enclosure means is sufficiently large that there is at least about ½ inch between the sides of said thermostat and the sides of said enclosure means.

16. The controller of claim 13, where said distributed heat source is a planar heater located in a plane approximately ½ inch or more below the bottom of said thermostat, there being at least about ½ inch between the top of said thermostat and the top of said enclosure means.

17. The controller of claim 13, where said controller is detachable from the wall on which said thermostat is located, and wherein said heat guidance means includes means for hanging said enclosure means on said wall.

18. The controller of claim 13, where the bottom of said enclosure means is substantially open, and said distributed heat source is located between the bottom of said enclosure means and said thermostat.

19. The controller of claim 18, where said distributed heat source is substantially planar, said plane extending substantially across the cross-section of said enclosure means and being positioned approximately perpendicular to the side walls of said enclosure means, the top of said enclosure means including apertures to allow exit of air from said enclosure means into said room.

20. The controller of claim 19, wherein said distributed heat source is an electrical heater and the projection of said enclosure means from said wall is at least ¼ more than the projection of said thermostat from said wall.

21. The controller of claim 20, where said distributed heat source includes a heat conductive metal having openings therein through which room air passes into said enclosure means.

22. A thermostat range control device for controlling the environment around a wall mounted thermostat, comprising:

a wall mounted thermostat, an enclosure means adapted to be mounted on the wall on which said thermostat is located, said enclosure means being a vertical columnar structure surrounding said thermostat and having a thermostat opening therein through which said thermostat projects into said enclosure means, said enclosure means including means for sending only heated air to said thermostat when said controller device is operative, said means for sending including:

an intake opening in said enclosure means located below said thermostat through which room air enters said enclosure means, a distributed heater located in said enclosure means between said thermostat opening and said intake opening and extending across a substantial portion of the cross-sectional area of said enclosure means, said heater having multiple openings therein through which said room air passes and is heated, an exit opening in said enclosure means located above said thermostat through which said heated air leaves said enclosure means, wherein said exit opening is located directly vertically above said distributed heater, and said heater is directly vertically above said intake opening.

* * * * *